United States Patent
Tsurumi

(10) Patent No.: US 9,520,938 B2
(45) Date of Patent: Dec. 13, 2016

(54) OPTICAL TRANSMITTING DEVICE, FAULT DETERMINING METHOD AND FAULT DIAGNOSIS SYSTEM

(71) Applicant: FUJITSU LIMITED, Kawasaki-shi, Kanagawa (JP)

(72) Inventor: Tsutomu Tsurumi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 67 days.

(21) Appl. No.: 14/682,449

(22) Filed: Apr. 9, 2015

(65) Prior Publication Data

US 2015/0365164 A1    Dec. 17, 2015

(30) Foreign Application Priority Data

Jun. 12, 2014  (JP) .................................. 2014-121797

(51) Int. Cl.
*H04B 10/50*  (2013.01)
*H04B 10/079*  (2013.01)

(52) U.S. Cl.
CPC .... *H04B 10/07955* (2013.01); *H04B 10/0799* (2013.01); *H04B 10/50* (2013.01); *H04B 10/5057* (2013.01)

(58) Field of Classification Search
CPC ...................... H04B 10/07955; H04B 10/5057; H04B 10/0799; H04B 10/50
USPC ................................... 398/23, 198
See application file for complete search history.

(56) References Cited

U.S. PATENT DOCUMENTS

| | | | | |
|---|---|---|---|---|
| 6,040,931 A | * | 3/2000 | Miyazaki | H04B 10/504 398/1 |
| 2002/0001115 A1 | | 1/2002 | Ishida et al. | |
| 2003/0147577 A1 | | 8/2003 | Kataoka et al. | |
| 2016/0020853 A1 | * | 1/2016 | Akiyama | H04B 10/07955 398/38 |

FOREIGN PATENT DOCUMENTS

| | | |
|---|---|---|
| JP | 2002-23119 | 1/2002 |
| JP | 2003-234703 | 8/2003 |

* cited by examiner

*Primary Examiner* — Leslie Pascal
(74) *Attorney, Agent, or Firm* — Staas & Halsey LLP

(57) ABSTRACT

An optical transmitting device includes: a light source; an optical modulator configured to modulate light from the light source based on an electric signal corresponding to transmission data, and output an optical signal based on the electric signal; a measuring section configured to measure power of the optical signal in each of measurement bands which are different from with each other and narrower than a frequency band of the modulated optical signal; a determining section configured to determine whether or not the measured power is within a power range in each of the measurement bands; and an output section configured to output fault information indicating a fault in the optical modulator when the measured power is not within the power range.

20 Claims, 10 Drawing Sheets

| MODULATION SYSTEM | #1 | #2 | #3 | #4 | #5 | #6 | #7 | #8 | #9 |
|---|---|---|---|---|---|---|---|---|---|
| NRZ | 0 | 0 | 0 | 0 | 14 | 14 | 0 | 0 | 0 |
| Duobinary | 1 | 2 | 4 | 6 | 2 | 6 | 4 | 2 | 1 |
| CS-RZ | 10 | 1 | 1 | 1 | 2 | 1 | 1 | 1 | 10 |
| RZ-DPSK | 1 | 3 | 4 | 4 | 4 | 4 | 4 | 3 | 1 |
| RZ-DQPSK | 0 | 1 | 6 | 4 | 6 | 4 | 6 | 1 | 0 |
| ⋮ | ⋮ | ⋮ | ⋮ | ⋮ | ⋮ | ⋮ | ⋮ | ⋮ | ⋮ |

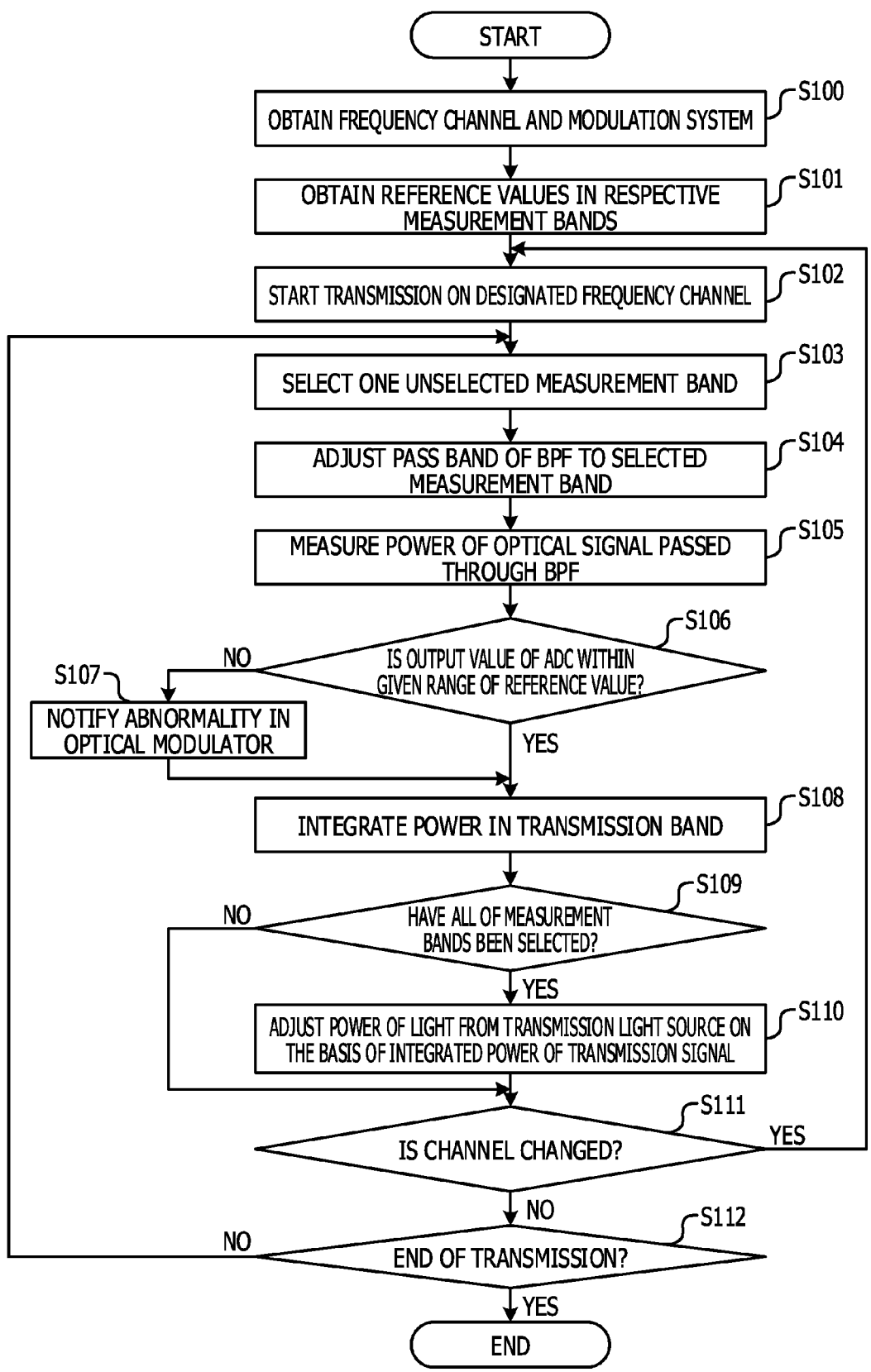

US 9,520,938 B2

OPTICAL TRANSMITTING DEVICE, FAULT DETERMINING METHOD AND FAULT DIAGNOSIS SYSTEM

CROSS-REFERENCE TO RELATED APPLICATION

This application is based upon and claims the benefit of priority from the prior Japanese Patent Application No. 2014-121797 filed on Jun. 12, 2014, the entire contents of which are incorporated herein by reference.

FIELD

The embodiment discussed in the specification is related to an optical transmitting device, a fault determining method, and a FAULT diagnosis system.

BACKGROUND

It is important to maintain and manage a communication network such as an optical communication network or the like as communication traffic is increased.

A related technology is described in Japanese Laid-open Patent Publication No. 2003-234703 or Japanese Laid-open Patent Publication No. 2002-023119.

SUMMARY

According to an aspect of the invention, an optical transmitting device includes: a light source; an optical modulator configured to modulate light from the light source based on an electric signal corresponding to transmission data, and output an optical signal based on the electric signal; a measuring section configured to measure power of the optical signal in each of measurement bands which are different from with each other and narrower than a frequency band of the modulated optical signal; a determining section configured to determine whether or not the measured power is within a power range in each of the measurement bands; and an output section configured to output fault information indicating a fault in the optical modulator when the measured power is not within the power range.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 illustrates an example of a determination table;

FIG. 10 illustrates an example of operation of a transmitting portion.

DESCRIPTION OF EMBODIMENTS

In a device on a transmitting side, for example, a transmission power of an optical signal is measured, and an amplification factor of light from a light source is controlled so that the measured transmission power is within a given range. A quality of the optical signal to be transmitted is thereby kept substantially uniform.

In maintenance and management of a communication network, quick recovery may be made when an abnormality has occurred on the communication network. For example, when a reception failure such as a Loss Of Signal (LOS), a Loss Of Frame (LOF), or the like has occurred in a device on a receiving side, whether the reception failure is due to an abnormality in a transmission line or an abnormality in a device on a transmitting side is preferable to be determined quickly. The device on the transmitting side detects an abnormality in Laser Diode (LD) Back Power or LD Front Power, a bias abnormality on a higher level than the LD, deviation of the wavelength of the LD, a Lithium Niobate (LN) bias abnormality, and the like. When an optical modulator in the device on the transmitting side is faulty, for example, the device on the transmitting side may not be able to detect the fault in the optical modulator.

Therefore, when a reception failure such as an LOS or the like has occurred in the device on the receiving side, whether the reception failure is due to a fault in a transmission line or a relay device on the communication network or a fault in the device on the transmitting side may not be determined quickly.

Figure 1:
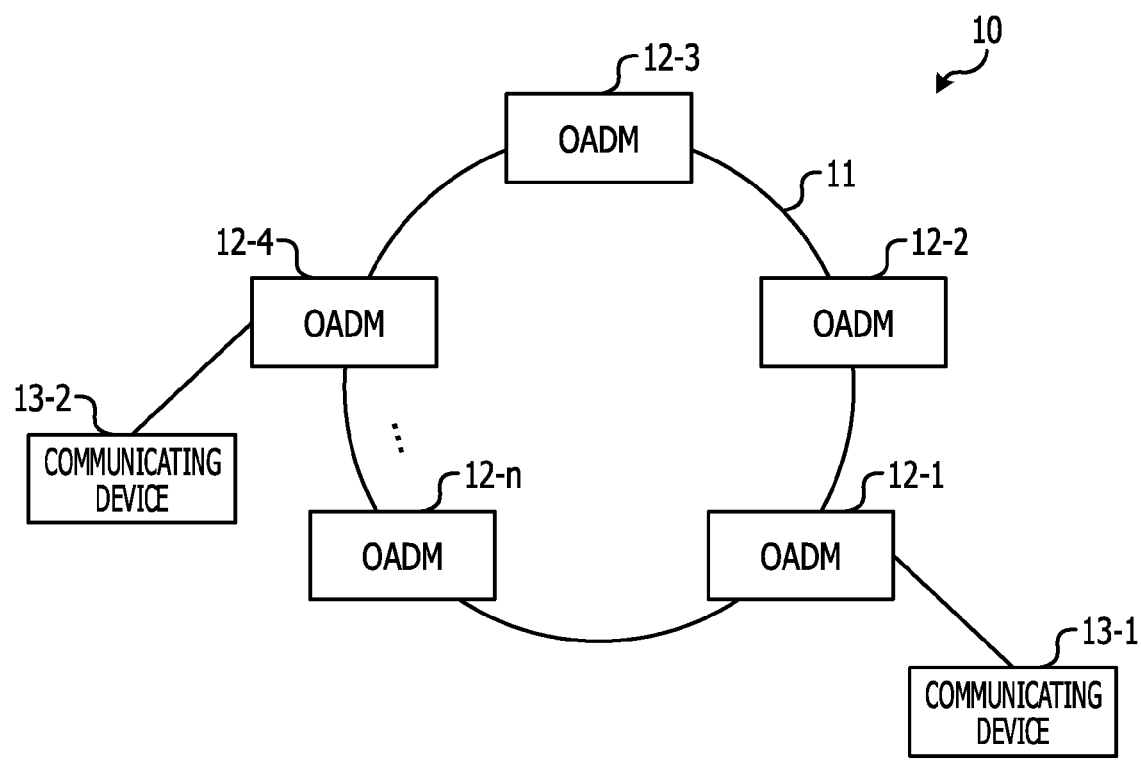
FIG. 1 illustrates an example of a communication network.

FIG. 1 illustrates an example of a communication network. A communication network 10 includes Optical Add-Drop Multiplexers (OADMs) 12-1 to 12-n and communicating devices 13-1 and 13-2. When the OADMs 12-1 to 12-n and the communicating devices 13-1 and 13-2 are referred to collectively without being distinguished from each other, the OADMs 12-1 to 12-n and the communicating devices 13-1 and 13-2 may be referred to as OADMs 12 and communicating devices 13, respectively.

Each of the OADMs 12 is coupled to one another by a cable 11 such as an optical fiber or the like. In FIG. 1, the OADMs 12 are coupled to one another by the cable 11 to form a ring network. Each of the communicating devices 13 is coupled to one of the OADMs 12. Each of the communicating devices 13 transmits and receives optical signals to and from the other communicating device 13 via one or more OADMs 12. Each of the communicating devices 13 may be an example of a light transmitting device.

An optical signal transmitted by the communicating device 13-1 on the communication network 10 illustrated in FIG. 1 is received by the communicating device 13-2 via the OADMs 12-1 to 12-4, for example. When a reception failure such as an LOS, an LOF, or the like has occurred in the communicating device 13-2, a cause of occurrence of the failure may be identified quickly to make quick recovery from the reception failure. When an optical modulator within the communicating device 13 itself has become faulty, the communicating device 13 outputs information to that effect to a computer or the like coupled to the communicating device 13. Therefore, when a reception failure has occurred in the communicating device 13 on the receiving side due to a fault in the optical modulator in the communicating device 13 on the transmitting side, an administrator of the communication network 10 or the like may quickly identify the cause.

Figure 2:
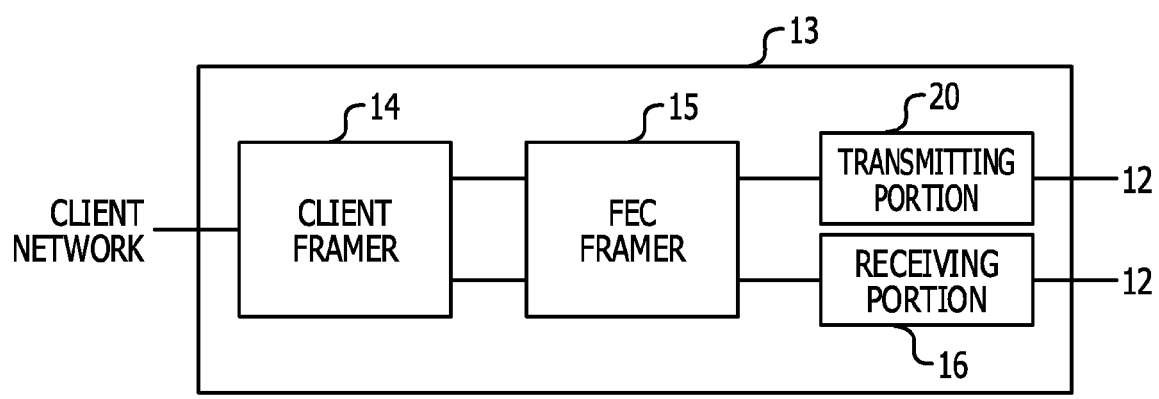
FIG. 2 illustrates an example of a communicating device.

FIG. 2 illustrates an example of a communicating device. The communicating device 13 includes a client framer 14, a Forward Error Correction (FEC) framer 15, a receiving portion 16, and a transmitting portion 20.

The client framer 14 frames data received from a client network such as Ethernet (registered trademark) or the like into an Optical Transport Network (OTN) frame, for example, and sends the OTN frame to the FEC framer 15. The client framer 14 converts an OTN frame received from the FEC framer 15 into the data format of the client network such as Ethernet or the like, and sends out resulting data to the client network.

The FEC framer 15 adds error correction code to the data in the OTN frame received from the client framer 14 to generate an FEC frame. The FEC framer 15 sends the generated FEC frame to the transmitting portion 20. The FEC framer 15 performs error correction on an FEC frame received from the receiving portion 16 based on FEC code included in the FEC frame. The FEC framer 15 sends an OTN frame including data after the correction to the client framer 14.

The receiving portion 16 converts an optical signal received from the OADM 12 via the cable such as an optical fiber or the like into an electric signal, and generates an FEC frame. The receiving portion 16 sends the generated FEC frame to the FEC framer 15.

The transmitting portion 20 converts the FEC frame received from the FEC framer 15 into an optical signal modulated according to the data included in the FEC frame. The transmitting portion 20 outputs the modulated optical signal to the OADM 12 via the cable.

Figure 3:
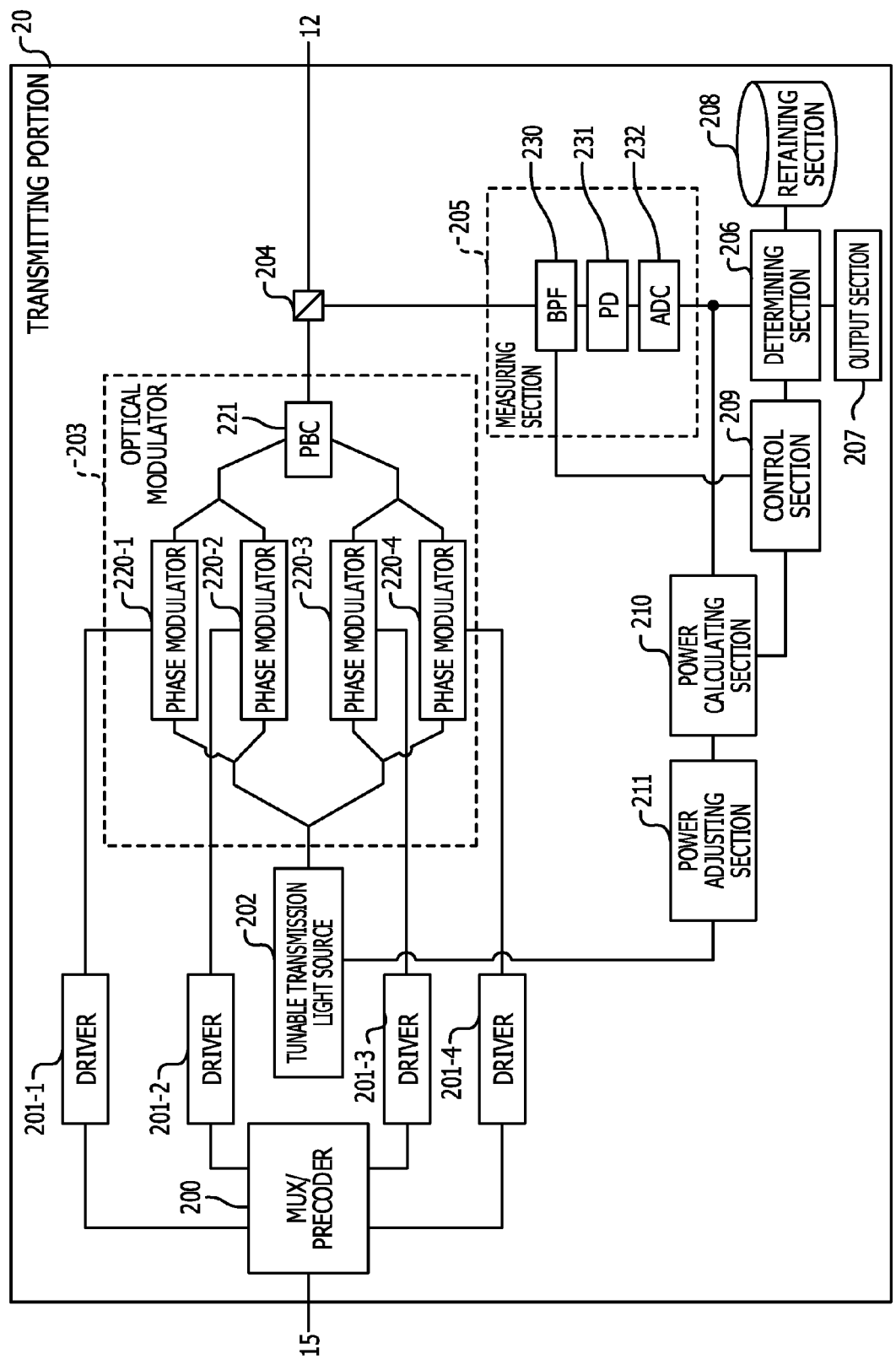
FIG. 3 illustrates an example of a transmitting portion.

FIG. 3 illustrates an example of a transmitting portion. The transmitting portion 20 includes a MUX (Multiplexer)/precoder 200, a driver 201, a tunable transmission light source 202, an optical modulator 203, a coupler 204, a measuring section 205, a determining section 206, an output section 207, a retaining section 208, a control section 209, a power calculating section 210, and a power adjusting section 211.

The retaining section 208 retains a determination table 2080. FIG. 4 illustrates an example of a determination table. As illustrated in FIG. 4, for example, the determination table 2080 stores reference values 2082 for power in respective measurement bands in association with each modulation system 2081. "#1" to "#9" are information identifying the respective measurement bands. Each of the measurement bands is narrower than a frequency band of a frequency spectrum of the modulated optical signal. The measurement band may be 6 GHz, for example.

When one optical modulator 203 is provided within the transmitting portion 20, one modulation system carried out by the optical modulator 203 provided within the transmitting portion 20 is identified. Therefore, in the case where one optical modulator 203 is provided within the transmitting portion 20, it suffices to store, in the determination table 2080, the reference values 2082 for power in the respective measurement bands which correspond to the modulation system carried out by the one optical modulator 203. In that case, the determination table 2080 does not need to store reference values corresponding to other modulation systems. Thus, an amount of data retained by the retaining section 208 may be reduced.

The MUX/precoder 200 generates a data signal having a high bit rate by multiplexing the data within the FEC frame received from the FEC framer 15, and generates a clock signal of a frequency corresponding to the bit rate of the data signal. The MUX/precoder 200 performs encoding processing using a difference between a code preceding by one bit and a present code based on the generated data signal, and outputs a modulated signal corresponding to the data and the clock signal to each of drivers 201-1 to 201-4.

The tunable transmission light source 202 may be a light source capable of changing the wavelength and power of light generated therein. The tunable transmission light source 202 may be a tunable laser diode, for example. The tunable transmission light source 202 generates light of a wavelength designated from a channel control section. The tunable transmission light source 202 generates the light having power that is in accordance with a control signal from the power adjusting section 211.

The optical modulator 203 includes phase modulators 220-1 to 220-4 and a Polarization Beam Combiner (PBC) 221. The light from the tunable transmission light source 202 is branched into two pieces of light within the optical modulator 203. Each of the two pieces of light is input to two sets of phase modulators 220. The drivers 201 apply modulation voltage to the respective phase modulators 220. The phase modulators 220 of the respective sets convert the light from the tunable transmission light source 202 into four-valued phase-modulated light based on the modulation voltage from the drivers 201. The PBC 221 multiplexes the optical signals modulated by the phase modulators 220 of the respective sets into orthogonal polarization states, and then outputs a resulting optical signal. FIG. 3, for example, illustrates the optical modulator 203 that performs modulation using a quadrature phase shift keying (QPSK) modulation system. When the optical modulator 203 performs modulation using another modulation system, the optical modulator 203 may have a configuration corresponding to the modulation system in use. In a case of the optical modulator 203 performing modulation using a binary phase shift keying (BPSK) modulation system, for example, two drivers 201 and two phase modulators 220 may be provided within the optical modulator 203.

The coupler 204 makes part of the optical signal output from the optical modulator 203 branch off, and supplies the part of the optical signal to the measuring section 205.

The measuring section 205 includes a Band Pass Filter (BPF) 230, a Photodiode (PD) 231, and an Analog to Digital Converter (ADC) 232. The BPF 230 is a tunable filter through which optical signals of wavelengths in a designated frequency band or wavelength band pass. The BPF 230 passes, to the PD 231, an optical signal in the frequency band designated from the control section 209, which optical signal is included in the optical signal branching out from the coupler 204. The bandwidth of the optical signal passed to the PD 231 by the BPF 230 may be narrower than the frequency band of the optical signal modulated by the optical modulator 203.

The PD 231 outputs, to the ADC 232, a voltage corresponding to the power of the optical signal that has passed through the BPF 230. The PD 231 may be an example of a photoelectric conversion element. The ADC 232 converts the analog value of the voltage output by the PD 231 into a digital value. The ADC 232 outputs the converted digital value to each of the determining section 206 and the power calculating section 210.

When the channel control section notifies the control section 209 of the frequency channel of the transmission signal, the control section 209 divides the frequency band of the transmission signal into a plurality of measurement bands as frequency bands each (for example 6 GHz) narrower than the frequency band of the transmission signal. The control section 209 selects the divided measurement bands one by one, and notifies the selected measurement band to each of the BPF 230, the determining section 206, and the power calculating section 210. The control section 209 notifies information on the modulation system of the optical modulator 203 to the determining section 206. The control section 209 may be a processor. The processor may for example execute a program stored in a memory to thereby perform the control of the control section 209.

The determining section 206 refers to the determination table 2080 within the retaining section 208, and obtains reference values in respective measurement bands which are associated with the modulation system notified from the control section 209. The determining section 206 determines, for each measurement band notified from the control section 209, whether or not the value output from the ADC 232 is within a given range. The given range may be a range of the reference value minus two to the reference value plus two, both inclusive, for example. The determining section 206 may be a processor, or may be included in a processor as the control section 209. The processor may for example execute a program stored in a memory to thereby perform the processing of the determining section 208.

When the value output from the ADC 232 is not within the given range, the determining section 206 notifies the output section 207 of information on the measurement band in which the value outside the given range is output. The output section 207 outputs the information on the measurement band which is received from the determining section 206 to an output device such as a display or the like together with information indicating an abnormality in the optical modulator 203.

Figure 5:
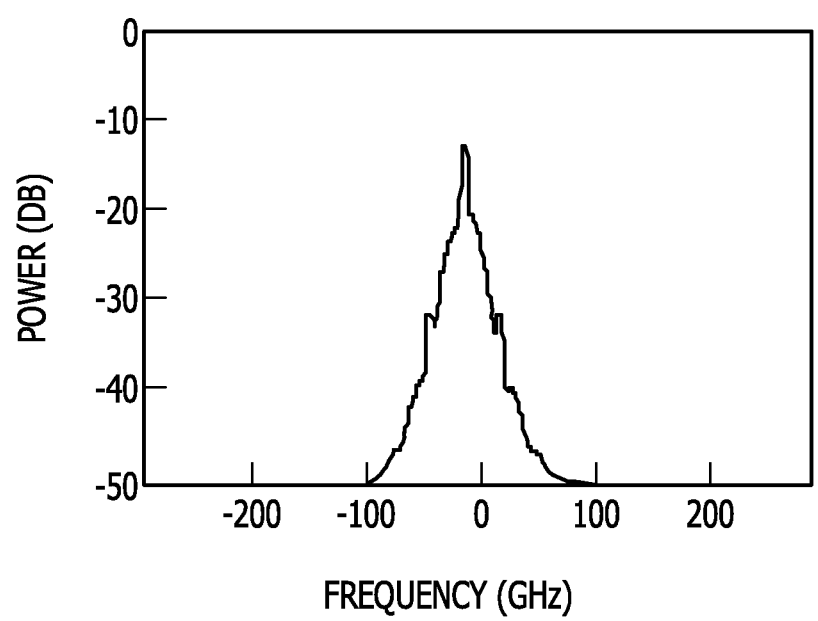
FIG. 5 illustrates an example of a waveform of a Non Return to Zero (NRZ) transmission signal.
Figure 6:
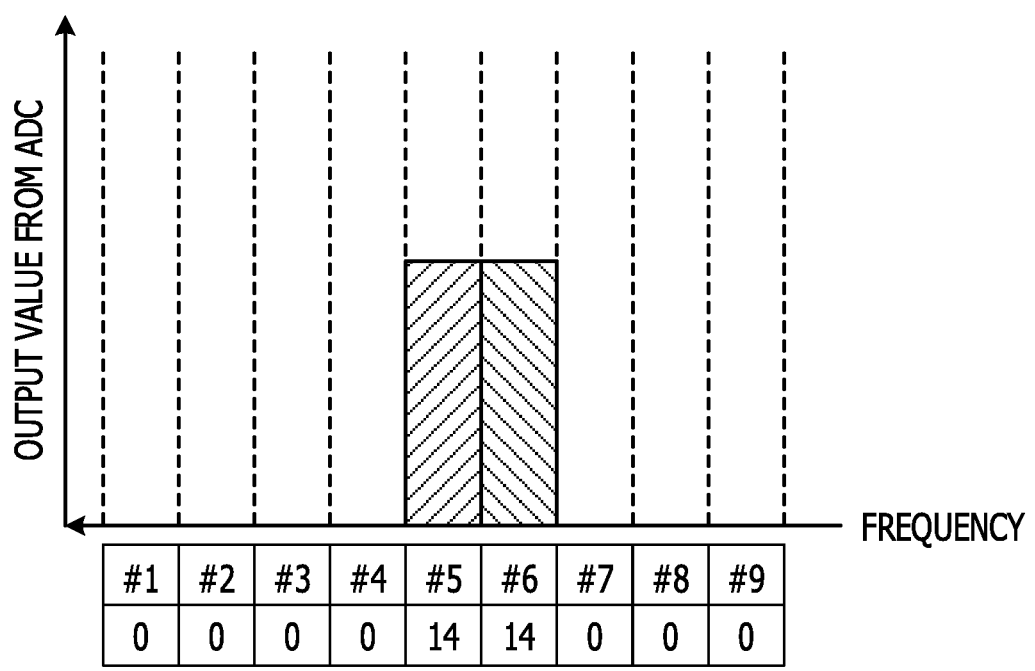
FIG. 6 illustrates an example of reference values in respective measurement bands in an NRZ.

In a case where the modulation system is Non Return to Zero (NRZ), for example, the optical signal modulated by the optical modulator 203 may have a waveform as illustrated in FIG. 5, for example. FIG. 5 illustrates an example of a waveform of an NRZ transmission signal. The reference values in the respective measurement bands may be values as illustrated in FIG. 6, for example. FIG. 6 illustrates an example of reference values in respective measurement bands in an NRZ.

In the case where the modulation system is NRZ, when the following (1) and (2), for example, are both satisfied, the determining section 206 determines that the output values from the ADC 232 are within given ranges from the reference values. (1) The output values from the ADC 232 in the measurement bands #1 to #4 and #7 to #9 are within a range of 0 to 2 both inclusive. (2) The output values from the ADC 232 in the measurement bands #5 and #6 are within a range of 12 to 16 both inclusive.

Figure 7:
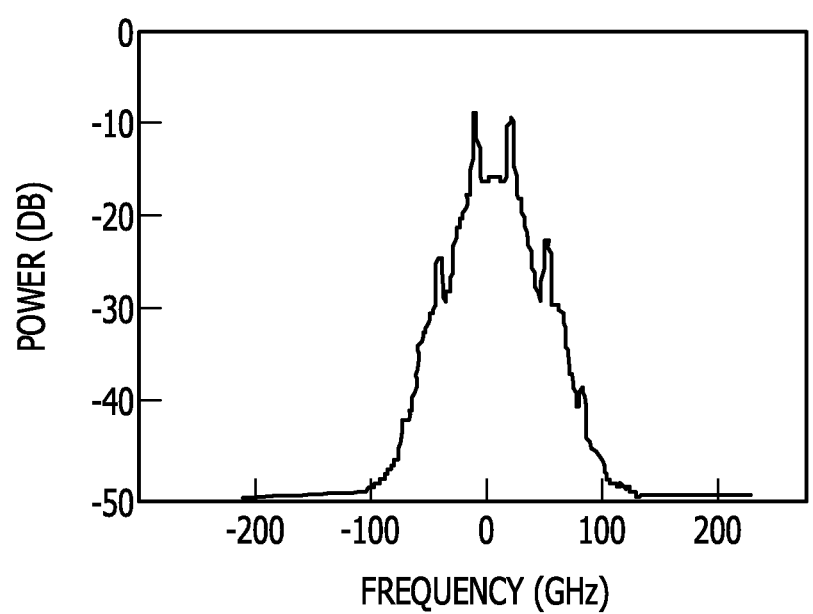
FIG. 7 illustrates an example of a waveform of a Carrier-Suppressed-Return to Zero (CS-RZ) transmission signal.
Figure 8:
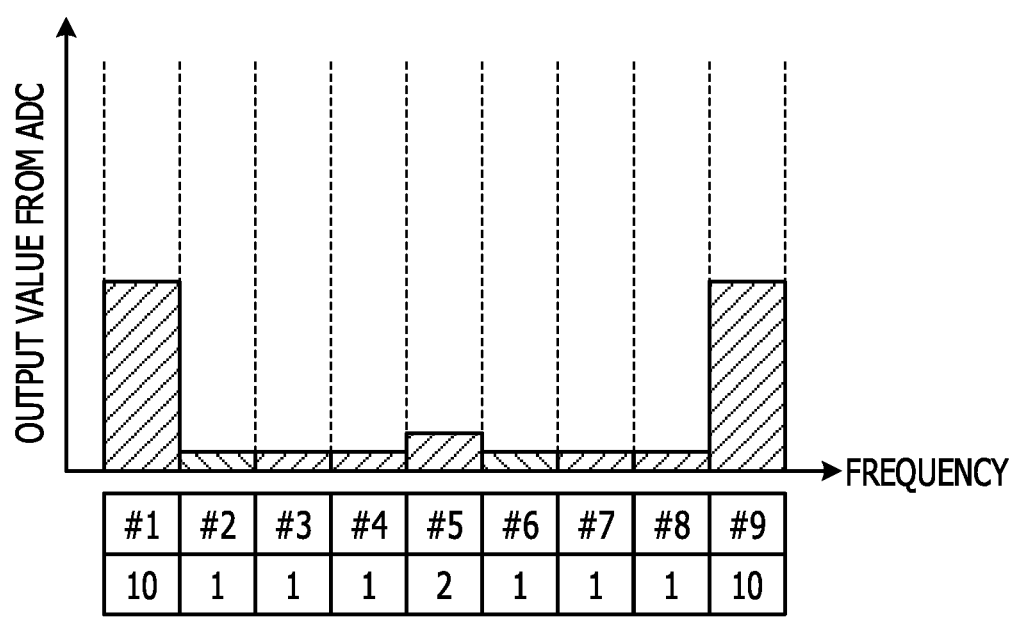
FIG. 8 illustrates an example of reference values in respective measurement bands in a CS-RZ.

In a case where the modulation system is Carrier-Suppressed-Return to Zero (CS-RZ), the optical signal transmitted from the optical modulator 203 may have a waveform as illustrated in FIG. 7, for example. FIG. 7 illustrates an example of a waveform of a CS-RZ transmission signal. The reference values in the respective measurement bands may be values as illustrated in FIG. 8, for example. FIG. 8 illustrates an example of reference values in respective measurement bands in a CS-RZ.

In the case where the modulation system is CS-RZ, when the following (3) to (5), for example, are all satisfied, the determining section 206 determines that the output values from the ADC 232 are within given ranges from the reference values. (3) The output values from the ADC 232 in the measurement bands #1 and #9 are within a range of 8 to 12 both inclusive. (4) The output values from the ADC 232 in the measurement bands #2 to #4 and #6 to #8 are within a range of 0 to 3 both inclusive. (5) The output value from the ADC 232 in the measurement band #5 is within a range of 0 to 4 both inclusive.

The power calculating section 210 obtains the digital value of power which is output from the ADC 232 in each measurement band designated from the control section 209, sums the obtained digital values for the frequency band of the whole of the transmission signal, and thereby calculates the power of the whole of the transmission signal. The power calculating section 210 sends the calculated digital value of power to the power adjusting section 211.

The power adjusting section 211 compares the digital value of the power of the whole of the transmission signal which is received from the power calculating section 210 with a digital value of power serving as a reference. The power adjusting section 211 generates a control signal for controlling the power of the light generated by the tunable transmission light source 202 so as to reduce a difference between the power of the whole of the transmission signal and the power serving as the reference. The power adjusting section 211 supplies the generated control signal to the tunable transmission light source 202. Therefore, the power adjusting section 211 may maintain the power of the optical signal transmitted from the transmitting portion 20 at a desired value.

The power adjusting section 211 has a function of outputting information indicating an abnormality in the transmitting portion 20 to the output device such as a display provided to the communicating device 13 or the like or outputting the information to another device via a communication line when the power adjusting section 211 determines that the control signal for adjusting the transmission power is not normal. Cases where the control signal for adjusting the transmission power is not normal may include cases where the control signal does not change from a maximum value or a minimum value, for example.

Figure 9:
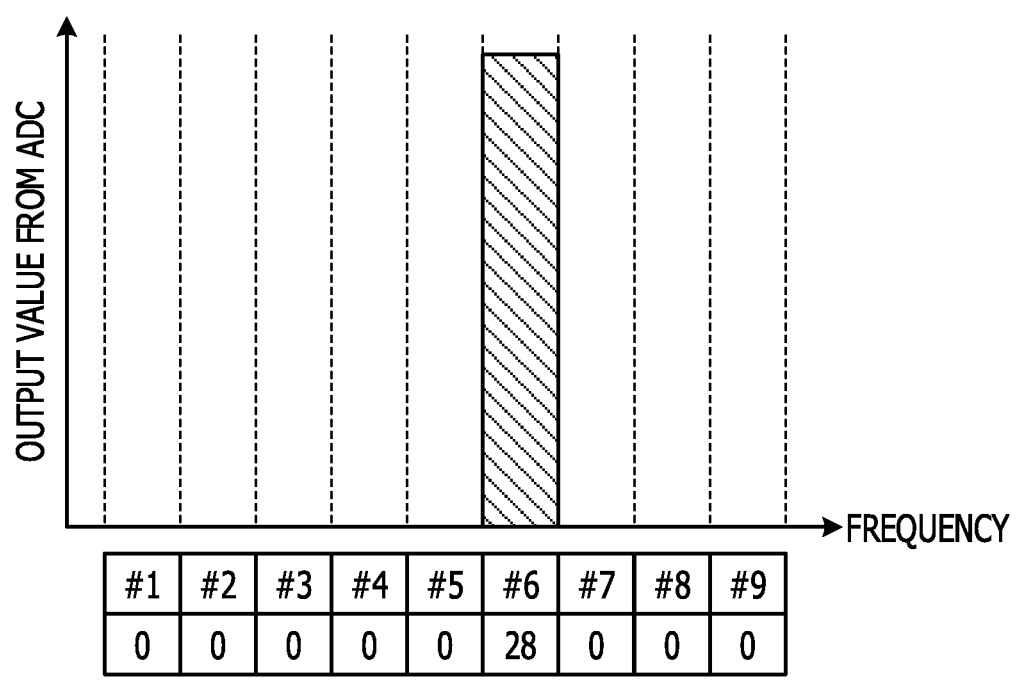
FIG. 9 illustrates an example of output values of an Analog to Digital Converter (ADC)

For example, when the optical modulator 203 is faulty, and an unmodulated optical signal is output from the optical modulator 203, the output values of the ADC 232 in the respective measurement bands may be values as illustrated in FIG. 9, for example. FIG. 9 illustrates an example of output values of an ADC. FIG. 9 illustrates the output values of the ADC 232 in the respective measurement bands in a case where the optical modulator 203 is faulty.

Even if the optical modulator 203 is faulty, the control signal for adjusting the transmission power is normal as long as the power of the whole of the transmission signal is controlled to be a desired value by the power adjusting section 211. Thus, the power adjusting section 211 may not detect the abnormality in the transmitting portion 20.

The determining section 206 compares, for each modulation system, the digital value of power measured in each measurement band with the reference value. When the determining section 206 determines that the digital value of power measured in a measurement band is not within the given range from the reference value, the output section 207 outputs information to that effect to the outside.

For example, when the output values of the ADC 232 in the respective measurement bands are values as illustrated in FIG. 9, the determining section 206 determines that an output value from the ADC 232 in at least a certain measurement band is not within the given range from the reference value in any of the modulation systems. The output section 207 outputs information indicating an abnormality in the optical modulator 203 to the output device such as a display or the like.

The administrator or the like of the communicating device 13 and the communication network 10 may therefore realize quickly that the optical modulator 203 is faulty. The administrator or the like of the communicating device 13 and the communication network 10 may quickly determine the cause of a reception failure in the communicating device 13 on the receiving side.

FIG. 10 illustrates an example of operation of a transmitting portion. The transmitting portion 20 may start the operation illustrated in FIG. 10 at a time of a start of transmission of an optical signal, for example.

The control section 209 obtains information on a frequency channel and a modulation system from the channel control section (S100). The control section 209 notifies the information on the modulation system to the determining section 206. The determining section 206 refers to the determination table 2080 within the retaining section 208, and obtains reference values in the respective measurement bands which are associated with the modulation system notified from the control section 209 (S101).

The tunable transmission light source 202 generates light of a wavelength corresponding to the frequency channel designated from the channel control section. The optical modulator 203 modulates the light from the tunable transmission light source 202 according to the modulation voltage supplied from the drivers 201, and starts to transmit the modulated optical signal (S102).

The control section 209 divides the frequency band of the transmission signal into a plurality of measurement bands. The control section 209 selects one unselected measurement band among the plurality of measurement bands (S103), and sends information on the selected measurement band to the determining section 206, the power calculating section 210, and the BPF 230.

The BPF 230 adjusts a pass band to the measurement band based on the information on the measurement band which is received from the determining section 206 (S104). The BPF 230 passes, to the PD 231, an optical signal in the measurement band designated from the control section 209 which optical signal is included in the optical signal branching off from the coupler 204.

The PD 231 measures the power of the optical signal passed through the BPF 230 by outputting a voltage corresponding to the power of the optical signal passed through the BPF 230 to the ADC 232 (S105). The ADC 232 converts the analog value of the voltage output by the PD 231 into a digital value corresponding to the analog value, and outputs the converted digital value to each of the determining section 206 and the power calculating section 210.

The determining section 206 obtains a reference value corresponding to the measurement band received from the control section 209 in operation S103 from the reference values in the respective measurement bands which reference values are obtained in operation S101. The determining section 206 determines whether or not the output value from the ADC 232 is within a given range from the obtained reference value (S106). When the output value from the ADC 232 is within the given range from the obtained reference value (S106: Yes), the power calculating section 210 performs operation S108.

When the output value from the ADC 232 is not within the given range from the obtained reference value (S106: No), the determining section 206 sends information on the measurement band which information is received from the control section 209 in operation S103 to the output section 207. The output section 207 notifies an abnormality in the optical modulator 203 by outputting the information on the measurement band which information is received from the determining section 206 to the output device such as a display or the like together with information indicating the abnormality in the optical modulator 203 (S107).

The power calculating section 210 integrates the digital values of power of the whole of the transmission signal by integrating output values from the ADC 232 (S108). The control section 209 determines whether or not all of the measurement bands have been selected (S109). When there is an unselected measurement band (S109: No), the control section 209 performs operation S111.

When all of the measurement bands have been selected (S109: Yes), the control section 209 instructs the power calculating section 210 to adjust transmission power. The power calculating section 210 sends the integrated digital value of power of the whole of the transmission signal to the power adjusting section 211, and resets the integrated value to zero. The power adjusting section 211 generates a control signal for controlling the power of the light generated by the tunable transmission light source 202 so as to reduce a difference between the digital value of the power of the whole of the transmission signal which digital value is received from the power calculating section 210 and the digital value of power serving as a reference. The power adjusting section 211 adjusts the power of the light from the tunable transmission light source 202 by supplying the generated control signal to the tunable transmission light source 202 (S110).

The control section 209 determines whether or not an instruction to change the frequency channel is given from the channel control section (S111). When an instruction to change the frequency channel is given (S111: Yes), the tunable transmission light source 202 and the optical modulator 203 perform operation S102 again.

When no instruction to change the frequency channel is given (S111: No), the tunable transmission light source 202 and the optical modulator 203 determine whether or not an instruction to end the transmission is given from the channel control section (S112). When no instruction to end the transmission is given (S112: No), the control section 209 performs operation S103 again. When an instruction to end the transmission is given (S112: Yes), the transmitting portion 20 ends the processing illustrated in FIG. 10.

In communicating device 13, a fault in the optical modulator 203 may be detected quickly. The administrator or the like of the communicating device 13 and the communication network 10 may determine the cause of a reception failure in the communicating device 13 on the receiving side more quickly.

In the communicating device 13, information on a measurement band in which power not within the given range from the reference value is transmitted is output, together with information indicating the fault in the optical modulator 203. The administrator or the like of the communicating device 13 may therefore recognize the state of the fault in the optical modulator 203 in more detail.

In the communicating device 13, power in each measurement band is measured while changing the pass band of the BPF 230. Thus, the power in each measurement band may be measured without a plurality of PDs 231 for measuring power being provided. Therefore, the number of parts of the communicating device 13 may be reduced, and thus an increase in cost of the communicating device 13 may be reduced.

In the communicating device 13, reference values in respective measurement bands are retained for each modulation system. Thus, even when the modulation system is changed, a fault in the optical modulator 203 may be determined for a transmission signal in the modulation system after the change.

In the communicating device 13, the power of light from the tunable transmission light source 202 is adjusted using a measured value of power of the transmission signal in each measurement band. Thus, commonality is achieved between hardware for adjusting transmission power and hardware for detecting a fault in the optical modulator 203. Therefore, the number of parts of the communicating device 13 may be reduced, and an increase in cost of the communicating device 13 may be reduced.

For example, the BPF 230 capable of changing the pass band thereof may be used and the pass band of the BPF 230 may be changed to each measurement band, and the PD 231 may detect the power of an optical signal passed through the BPF 230. For example, a BPF having a fixed pass band and passing an optical signal in the same bandwidth as a measurement band may be provided for each measurement band, and the PD 231 may measure the power of the optical signal passed through each BPF. A plurality of narrow-band PDs capable of measuring the power of an optical signal in a measurement band may be provided for respective measurement bands, and the respective PDs may measure the power of optical signals in the respective measurement bands. When the plurality of narrow-band PDs are provided, the BPF may be unnecessary.

The power of the transmission signal may be measured in measurement bands that are each 6 GHz, for example. The bandwidth of the measurement bands may be narrower or wider than 6 GHz as long as the bandwidth of the measurement bands is narrower than the bandwidth of the transmission signal. When the measurement bands are narrower than 6 GHz, for example, the determining section 206 may analyze the shape of a frequency spectrum of the transmission signal in more detail with a higher frequency resolution.

For example, even when the measurement bands are wider than 6 GHz (for example about 10 to 20 GHz), the determining section 206 may determine whether or not the transmission signal has become an unmodulated signal due to a fault in the optical modulator 203. Therefore, an inexpensive BPF 230 having a relatively wide pass band may be used to reduce the cost of the communicating device 13.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An optical transmitting device comprising:
    a light source;
    an optical modulator configured to modulate light from the light source based on an electric signal corresponding to transmission data, and output an optical signal based on the electric signal;
    a measuring section configured to measure power of the optical signal in each of measurement bands which are different from with each other and narrower than a frequency band of the modulated optical signal;
    a determining section configured to determine whether or not the measured power is within a power range in each of the measurement bands; and
    an output section configured to output fault information indicating a fault in the optical modulator when the measured power is not within the power range.

2. The optical transmitting device according to claim 1, wherein when the measured power is not within the power range, the output section outputs band information on the measurement band of the measured power together with the fault information.

3. The optical transmitting device according to claim 1, wherein the measuring section includes:
    a tunable filter capable of changing a wavelength band to be passed; and
    a photoelectric conversion element configured to output a signal corresponding to the power of the optical signal from the tunable filter.

4. The optical transmitting device according to claim 3, further comprising:
    a control section configured to measure the power based on the signal output by the photoelectric conversion element in each of the measurement bands while changing the wavelength band of the tunable filter.

5. The optical transmitting device according to claim 3, further comprising:
    an analog to digital converter configured to convert the signal output by the photoelectric conversion element into a digital signal.

6. The optical transmitting device according to claim 1, further comprising:
    a retaining section configured to retain a reference value of power in each of the measurement bands in association with a modulation system.

7. The optical transmitting device according to claim 6, wherein the determining section sets the power range in each of the measurement bands based on the reference value.

8. The optical transmitting device according to claim 1, further comprising
    a power adjusting section configured to adjust power of the light emitted by the light source based on the power of the optical signal.

9. The optical transmitting device according to claim 8, wherein the power adjusting section adjusts the power of the light emitted by the light source based on a total value of the measured power in each of the measurement bands.

10. A fault determining method comprising:
    modulating light from a light source based on an electric signal corresponding to transmission data, and outputting an optical signal by an optical modulator;
    measuring power of the optical signal in each of measurement bands which are different from with each other and narrower than a frequency band of the optical signal;
    determining whether or not the measured power is within a power range in each of the measurement bands; and
    outputting information indicating a fault in the optical modulator when the measured power is not within the power range.

11. The fault determining method according to claim 10, further comprising:

outputting band information on the measurement band of the measured power together with the fault information when the measured power is not within the power range.

12. The fault determining method according to claim 10, further comprising:
retaining a reference value of power in each of the measurement bands in association with a modulation system.

13. The fault determining method according to claim 12, further comprising:
Setting the power range in each of the measurement bands based on the reference value.

14. The fault determining method according to claim 11, further comprising:
adjusting power of the light emitted by the light source based on the power of the optical signal.

15. The fault determining method according to claim 11, further comprising:
adjusting the power of the light emitted by the light source based on a total value of the power measured in each of the measurement bands.

16. A fault diagnosis system comprising:
a light source;
an optical modulator configured to modulate light from the light source based on an electric signal corresponding to transmission data, and output an optical signal based on the electric signal;
a measuring section configured to measure power of the optical signal in each of different measurement bands which are different from with each other and narrower than a frequency band of the modulated optical signal; and
a processor configured to process the measured power;
the processor performs operations of:
determining whether or not the measured power is within a power range in each of the measurement bands, and
outputting fault information indicating a fault in the optical modulator when the measured power is not within the power range.

17. The fault diagnosis system according to claim 16, wherein the processor outputs band information on the measurement band of the measured power together with the fault information when the measured power is not within the power range.

18. The fault diagnosis system according to claim 16, wherein the processor retains a reference value of power in each of the measurement bands in association with a modulation system in a retaining section.

19. The fault diagnosis system according to claim 18, wherein the processor sets the power range in each of the measurement bands based on the reference value.

20. The fault diagnosis system according to claim 16, wherein the processor adjusts power of the light emitted by the light source based on the power of the optical signal.

* * * * *